United States Patent [19]

Mifsud

[11] Patent Number: 4,557,348

[45] Date of Patent: * Dec. 10, 1985

[54] TUNABLE MARINE SEISMIC SOURCE

[75] Inventor: Joseph F. Mifsud, Houston, Tex.

[73] Assignee: Exxon Production Research Co., Houston, Tex.

[*] Notice: The portion of the term of this patent subsequent to Nov. 20, 2001 has been disclaimed.

[21] Appl. No.: 444,298

[22] Filed: Nov. 24, 1982

Related U.S. Application Data

[63] Continuation-in-part of Ser. No. 235,202, Feb. 17, 1981.

[51] Int. Cl.$^4$ ............................................. G01V 1/38
[52] U.S. Cl. .................................... 181/120; 181/402; 367/152
[58] Field of Search ............... 181/120, 121, 110, 119, 181/401, 402; 73/666; 367/143, 152, 189, 190; 248/559, 575, 576

[56] References Cited

U.S. PATENT DOCUMENTS

| | | | |
|---|---|---|---|
| 1,876,138 | 9/1932 | Fassett | 248/575 |
| 2,621,005 | 12/1952 | Turpin | 248/575 |
| 3,423,060 | 1/1969 | Fulling et al. | 248/575 |
| 4,483,411 | 11/1984 | Mifsud | 181/120 |

OTHER PUBLICATIONS

Borowitz et al., Text, A Contemporary View of Elementary Physics, McGraw Hill, 1968, pp. 442–447.

*Primary Examiner*—Nelson Moskowitz
*Assistant Examiner*—Ian J. Lobo
*Attorney, Agent, or Firm*—Keith A. Bell

[57] ABSTRACT

The disclosed device is a marine seismic source which emits a constantly varying FM signal in the 10 to 100 $H_z$ range. The seismic source utilizes an adjustable length cantilever spring rotatably attached to stiff acoustic radiators, which create a signal in the water. Varying the length of the cantilever spring as a function of the frequency will permit the device to be continuously tuned for maximum power output.

15 Claims, 6 Drawing Figures

TUNABLE MARINE SEISMIC SOURCE

RELATED APPLICATION

This is a continuation-in-part of U.S. Ser. No. 235,202, filed Feb. 17, 1981; the entirety of which is incorporated by reference.

BACKGROUND OF THE INVENTION

1. Object of the Invention

This invention relates to a tunable seismic energy source used to generate seismic signals in searching for petroleum beneath a water body. In particular, it relates to apparatus suitable for continuously tuning the output mechanical impedance of a seismic source so that a high percentage of the energy applied to the source transducer is converted to acoustic energy. The seismic source desirably is of the type producing a frequency modulated signal that sweeps the spectrum between about 10 and 100 Hz.

2. Field of the Invention

The ever more difficult search for petroleum has led to exploration in areas which were thought by many just a short time ago to be incapable of producing petroleum at an economically feasible price. The rising price of petroleum coupled with its relative domestic scarcity has made acceptable the costs associated with production in Alaska and the North Sea, as well as in a number of offshore areas.

Of the many methods used in prospecting for subsea petroleum, few have attained as widespread an acceptance as has the use of towable marine seismic sources.

The theory of operation in using marine acoustic sources to search for petroleum is quite simple. An acoustic signal is introduced into the water body. The acoustic wave propagates down through the water, across the water-floor interface, and into subfloor geologic formations. The resultant echoes are, to some extent, reflected back across the same path to an array of hydrophones located near the water's surface. Analysis of the signals produced by the hydrophones can provide some information concerning the structure of the subfloor geological formations and attendant petroleum accumulation in those formations.

The term "water" as used herein is meant to include swampwater, mud, marshwater, seawater or any other liquid containing sufficient water to enable operation of the invention.

There are many different methods of producing an acoustic pulse. For instance, the earliest attempts entailed the use of solid explosives. This method produces a strong low frequency signal which, accordingly, achieves substantial penetration into subfloor geologic formations and a strong return echo. However, solid explosives possess certain inherent drawbacks: they are dangerous to store, handle, and use. When set off in open water, they kill marine life. In a crowded area such as a harbor, they cannot be used at all. Solid explosives are orders of magnitude more expensive to use, on a per-shot basis, than are most other acoustic sources. Modification of the signature to achieve an acceptable frequency spectrum distribution is most difficult.

Apparatus using explosive gas mixtures, e.g., propane and oxygen, to produce an acoustic signal in the form of a pulse or shock wave have gained wide acceptance. The two major types of explosive gas guns are: first, those which operate by exploding a gas mixture behind a flexible membrane which is in contact with the water; and, second, those which operate by allowing the abrupt bubble from the gas explosion to pass directly into the water. An example of the former apparatus can be found in U.S. Pat. No. 3,658,149; an example of the latter apparatus can be found in U.S. Pat. No. 4,193,472.

Other devices using high pressure compressed gases to generate an acoustic pulse have also gained wide acceptance in the industry. These apparatus, or guns, typically employ a gas-holding chamber which is pressurized to attain some pre-set level and is fired by allowing the pressurized gas to explosively exit the gun into the surrounding water. Examples of openported pressurized gas guns are found in Chelminski, U.S. Pat. No. 3,653,460, and Baird U.S. Pat. No. 4,141,431.

The device of the present invention is a member of a class which generates a relatively low-power and low-frequency (10–100 Hz) signal known as a "chirp" which extends over a period of seconds. The transmitted signals are desirably low-frequency to reduce attenuation losses in the reflected waves. Unlike the previously mentioned devices which emit a short duration pulse and thereby provide a discrete echo at some readily determinable point in time, the chirp devices often vary the frequency of the transmitted signal in some pre-set manner so that a unique frequency in the reflected signal can be correlated as a function of time with that same frequency in the transmitted signal. A collection of received signals or "trace" can be mathematically manipulated to produce a subterranean map.

The transducer in subsea vibrator devices typically is an acoustic piston or plate in contact with the water and driven by a pneumatic or hydraulic actuator modulated at the desired frequency. An example of such a device is found in Mifsud U.S. Pat. No. 4,211,301. The patent does not discuss methods of continuously tuning the source for maximum output.

There is a limit to the amount of energy that can be introduced into a subsea acoustic wave. That amount depends on, inter alia, the size of the transducer, the amplitude of oscillation, the depth of source placement, temperature and salinity of the water, and the frequency of the transmission. When this threshhold amount of induced energy is exceeded, the source cavitates and produces gas bubbles rather than a clean acoustic signal. Nevertheless, the strength of the acoustic signal should be maximized to assure the strongest possible echo. The invention disclosed herein deals with apparatus suitable for maximizing the efficiency of such a marine seismic source by adjusting its output acoustIc impedance so that a higher percentage of the input power is used to radiate acoustic energy.

Other marine seismic sources are known which provide for prevention of cavitation. The disclosure in Graham et al, U.S. Pat. No. 3,691,516, provides a description of an apparatus having a pair of acoustic pistons located at opposite ends of the device. The acoustic pistons are held outward from the center of the seismic source by a pair of variable volume chambers. The pressure within the variable volume chambers is repetitively varied downward and then returned to the initial value. This sharp reduction in pressure causes the pistons to move inward initiating the pulse. Hydraulic cylinders attached to the pistons via piston rods then tend to restore the pistons to their original extended positions. The acceleration rate of the pistons is controlled using a feedback loop so that the pistons produce the maximum possible acoustic output power as limited by the cavitation threshold. The acceleration rate is varied by pressure control of the fluid introduced into the aforementioned hydraulic cylinders. The frequency of the device is changed by a fulcrum and beam arrangement operating in conjunction with the piston-restoring hydraulic cylinders.

The Graham et al device produces a pulse which has the maximum power attainable for the physical size of the acoustic pistons in their particular surrounding fluid. The device desirably operates just below the cavitation threshold. The device does not vary its output impedance to maximize output at a particular available power input using the apparatus of the instant invention.

Other marine seismic sources which suggest tuning the source for maximum output are typified by: Wisotsky; U.S. Pat. No. 3,349,367, Dickie et al; U.S. Pat. No. 3,392,369, Wallen; U.S. Pat. No. 4,030,063, and Pickens U.S. Pat. No. 4,142,171. Each of these patents involves a single frequency source.

SUMMARY OF THE INVENTION

The inventive marine seismic source has two radiating plates, mounted at opposite ends of a supporting frame, which are driven by a balanced double-ended, push-pull hydraulic drive cylinder. The source produces a frequency modulated signal which desirably is linearly swept through a low frequency spectrum by modulation of the hydraulic fluid pressure introduced into the drive cylinder. The mechanical impedance of the radiating plates is continuously varied with the sweeping frequency by a variable mechanical spring. Adjustment of the effective spring rate of the spring effectively optimizes the efficiency of the device by tuning the instantaneous output impedance of the radiating plates to one consisting mainly of radiation resistance for the instantaneous frequency.

DESCRIPTION OF THE PREFERRED EMBODIMENTS

Figure 1:
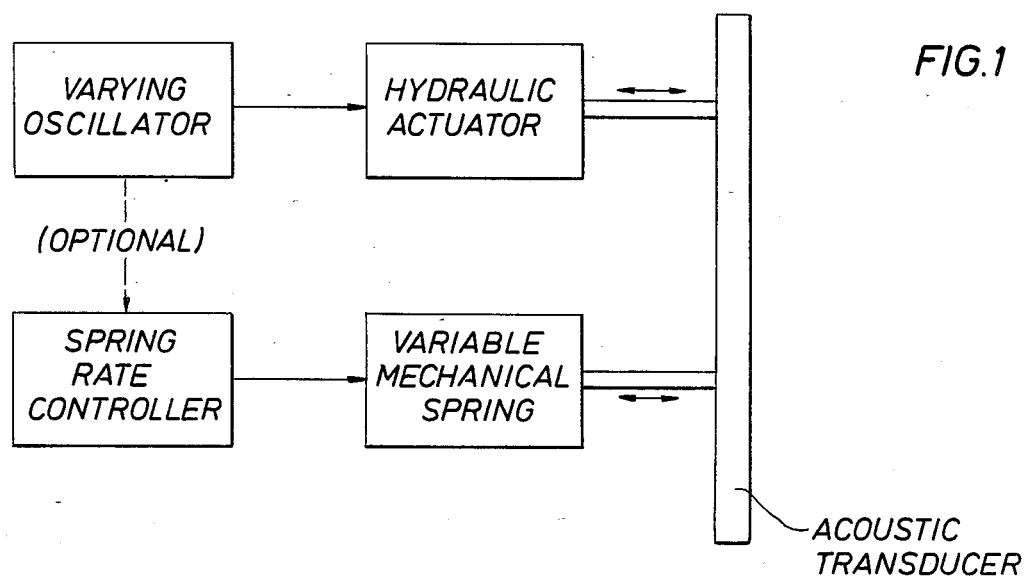
FIG. 1 is a block diagram of the invention.

The disclosed apparatus is conventional in some respects. In the preferred embodiment, the device emits a constantly varying FM signal which sweeps the low frequency spectrum included in the frequency range between about 10 Hz and about 100 Hz. The seismic source, as shown schematically in the block diagram of FIG. 1, uses a fairly stiff radiator moving via a connection with a hydraulic actuator oscillating at the desired frequency. The manner in which the frequency varies is a matter of choice. Typically, the rate will be linear with time. However, the rate may not be linear nor the range continuous. If the distance between the floor and the surface of the water body is a reinforcing multiple of some wavelength within the swept range, that frequency associated with that wavelength may be omitted from those swept. The invention, however, is unconventional in other respects. The acoustic radiator is also attached to one or more spring assemblies having a variable spring rate. The spring rate is varied as a function of frequency to continuously tune the output impedance of the transducers and, ideally, maximize the effective output power of the source.

The term "spring rate", as used throughout this specification, is meant to be synonymous with the terms "spring constant" or "force constant". The terms describe only the change in force with respect to distance, i.e., dF/dx. This invention, as discussed elsewhere, relates to varying the spring rate as a function of frequency and as a function of time where the frequency of the inventive genus of seismic sources vary as a function of time.

The variable spring system is made up of three parts: a driven piston physically connected to the acoustic radiating plate, a variable spring rate device which varies the overall spring rate of the output load of the system, and a spring rate controller which controls the spring rate directly or indirectly as a function of the drive frequency.

The variable spring system is used to achieve increased efficiency in marine seismic sources by adjusting the output acoustic impedance of the source transducer so that an increased amount of the input power is found in the output as acoustic energy. The transducers, or acoustic radiators as herein described, are continuously tuned as a function of the slowly varying FM acoustic output signal. The output impedance ($Z_r$) of an acoustic source is the sum of two components: a resistive load (R) and a reactive load ($\omega$ M; where $\omega$ is the radian frequency of vibration and M is the mass of the radiator plus the mass of fluid moving with the radiator).

$$Z_r = R + i\,\omega M$$

A spring will have the impedance:

$$Z_s = -K/\omega$$

where K is the spring constant.

A spring may be sized and thereafter attached to the acoustic radiator to cancel the inertial loading due to the mass of the radiator and the fluid moving with the radiator. The force constant (K) of the spring is to be continuously changed as a function of the frequency of the source such that:

$$K = \omega^2 M$$

Each of the spring systems attached to a radiating plate operates to vary its overall spring constant in a fairly straight forward manner. A cantilever or torsion bar having means connected thereto to vary the length or cross section of the cantilever or torsion as a function of the vibration frequency of the radiating plates is attached to those plates. Variation of those springs changes the spring constant of the system and therefore modifies the output impedance at the radiator.

Figure 2:
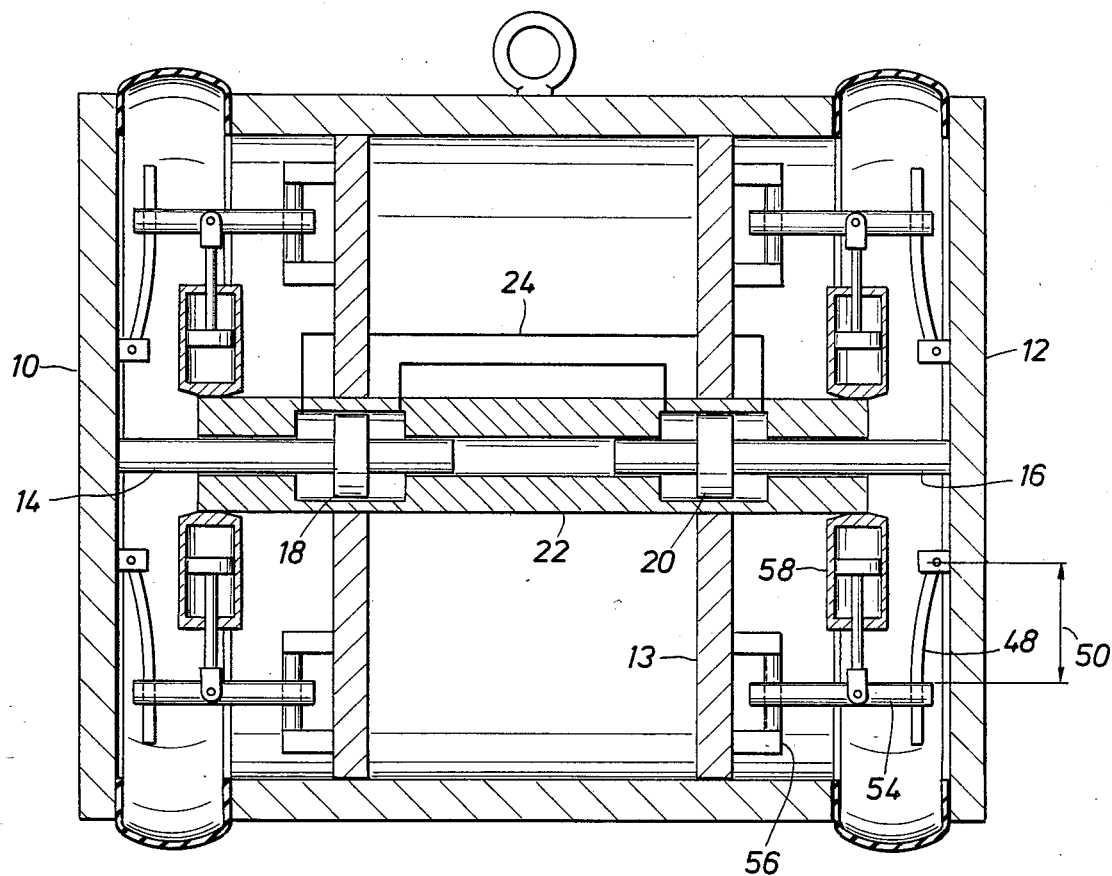
FIG. 2 schematically depicts, in cross-section, a seismic source built according to the invention.

In FIG. 2, acoustic radiating plates 10 and 12 are mechanically actuated to produce a signal through rods 14 and 16 by hydraulic actuating pistons 18 and 20. Actuating pistons 18 and 20 are double-acting and are reciprocated in hydraulic drive cylinder 22 under modulation from servo valve 24. The embodiment shown in FIG. 2 uses four variable-length cantilever springs 48, the effective length 50 of which, may be changed by varying the position of bushing block 54. The bushing block 54 is supported by slide rod 56 and moved back-and-forth along slide rod 56 by hydraulic cylinder assembly 58. Each of the cantilever springs 48 illustrated in FIG. 2 is double acting. That is to say that the springs exert pressure against movement of the radiator plates 10, 12 regardless of the direction they move. The two plates typically move 180° out of phase. They move simultaneously outward and inward. This balanced movement also balances the forces on the supporting framework and allows that frame to be of moderate size. The supporting framework is generally fixed and includes the support 13.

Figure 3:
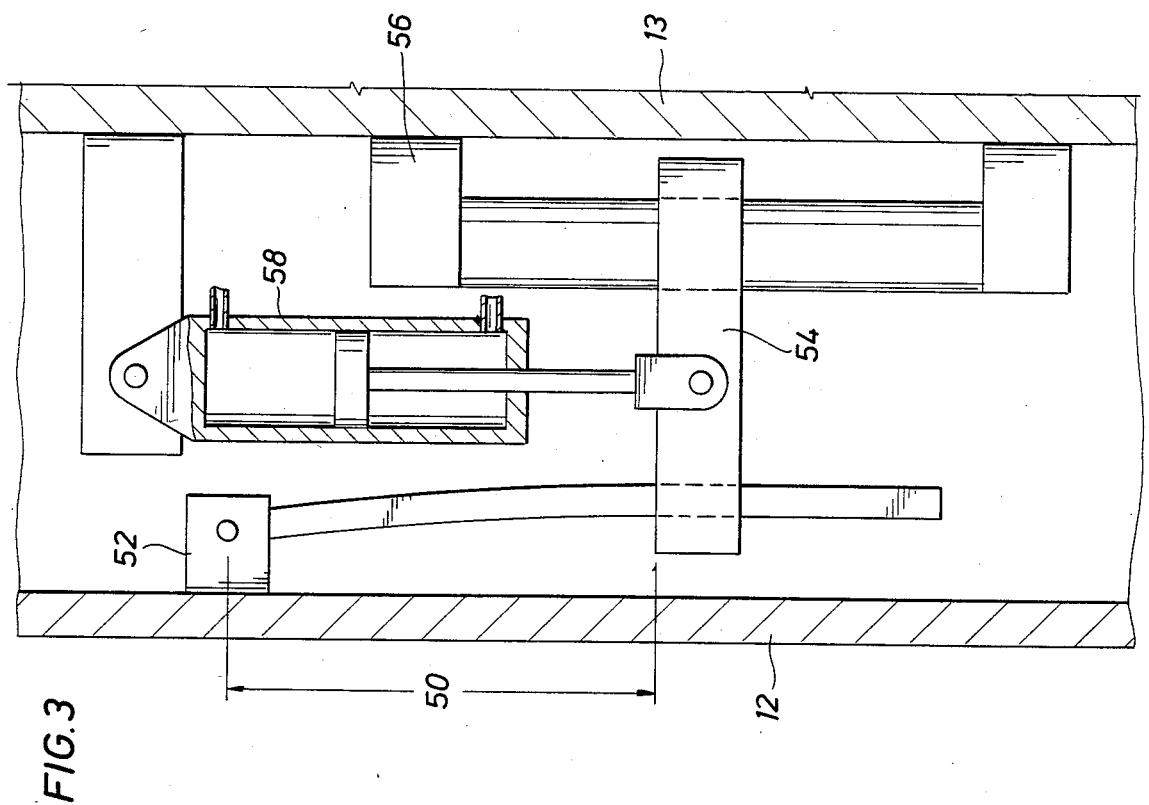
FIG. 3 shows, in schematic, one embodiment of the variable spring suitable for use in the disclosed seismic source using a cantilever of variable length.

FIG. 3 shows the variation, shown generally in FIG. 2, in greater detail.

Figure 4:
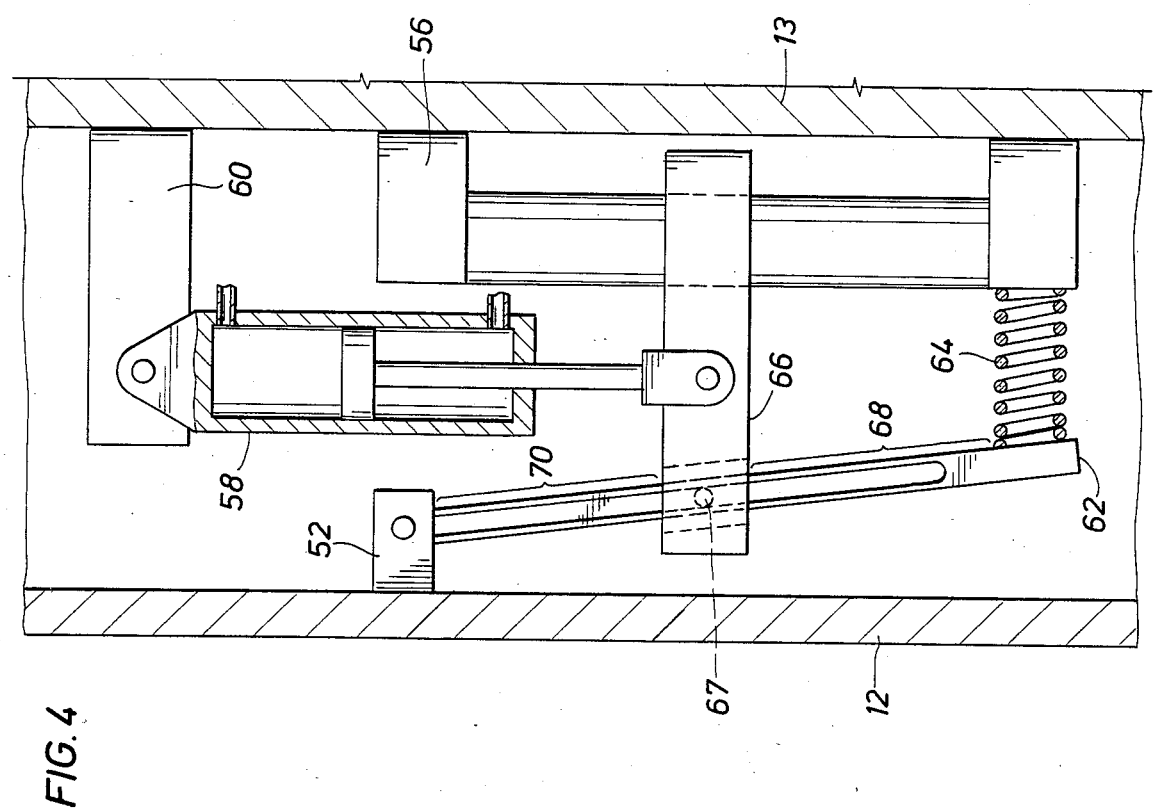
FIG. 4 shows, in schematic, a second embodiment of the variable spring suitable for use in the disclosed seismic source using a variable cantilever and coil spring.

FIG. 4 shows a variation of the invention, shown in detail, which may be substituted for the apparatus of FIG. 3 as mounted in the seismic source shown in FIG. 2.

The apparatus shown in FIG. 4 depicts another spring system for continuously varying the overall effective spring pressure applied between radiating plate 12 (or 10) and the support 13. Cantilever 62 is supported at one end by a radiating plate attachment block 52 and at the other end by coil spring 64. The depicted cantilever 62 has a cross section much like that of an I beam. Pins 67 extending from the inside of the hole in bushing block 66 fit in the opposing elongated recesses of cantilever 62 and support it. In this way the cantilever can slide axially through the hole and rotate about the pins 67 in the bushing block 66. The effective force constant of the spring assembly is proportional to the ratio of the length of lever arm 68 to that of lever arm 70. As with the embodiment shown in FIGS. 2 and 3, the effective force constant is variable through the use of a hydraulic cylinder 58 attached to a support 60. The configuration shown in FIG. 4 may be installed in the apparatus of FIG. 2. Desirably, four of the variable springs of FIG. 4 may be installed in the apparatus of FIG. 2. As is illustrated, slide block 56 is attached to support 13 and radiating plate attachment block 52 is attached to either of radiating plates 10 or 12.

Figure 5:
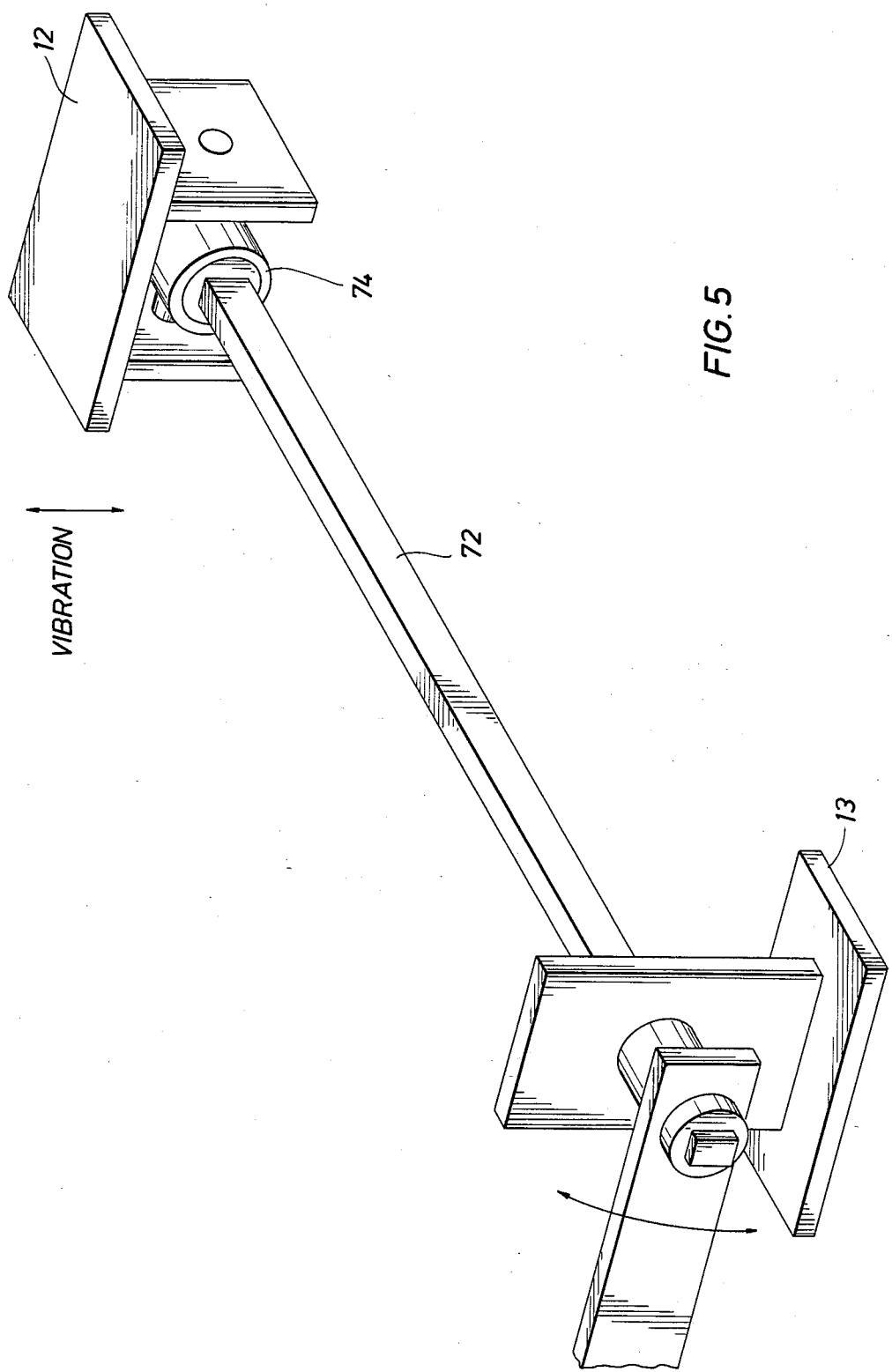
FIG. 5 shows, in schematic, a third embodiment of the variable spring suitable for use in the disclosed seismic source using a variable thickness cantilever spring.

FIG. 5 illustrates another configuration suitable for varying the force constant of the spring system attached to the radiation plates 12 (or 10). This embodiment uses a cantilever spring 72 whose cross-section is thicker in one direction than in the other. One end of the cantilever spring 72 is rotatably and pivotably attached to radiating plate 12 (or 10) through bearing 74. As the spring 72 is rotated, the tuning of the seismic source changes. Obviously, the flexible cantilever spring 72 stiffens when flexed in the direction of the longer cross-section. It may be turned by a hydraulic cylinder such as shown in the previous embodiments.

Each of the hydraulic cylinders described with respect to the embodiments in FIGS. 2 to 5 may just as well be pneumatic cylinders. The variation of the spring rate with the frequency of the device by moving the pneumatic or hydraulic cylinders can be accomplished in a number of ways. The cylinders may be moved with control means such as a servo responding to initiation of the signal to the actuator pistons 18 and 20 (as depicted in FIG. 2). Alternately, and more desirably, the control means comprises a frequency-to-voltage analog computer which controls a servo which in turn moves the hydraulic or pneumatic cylinder as a direct function of the frequency.

Figure 6:
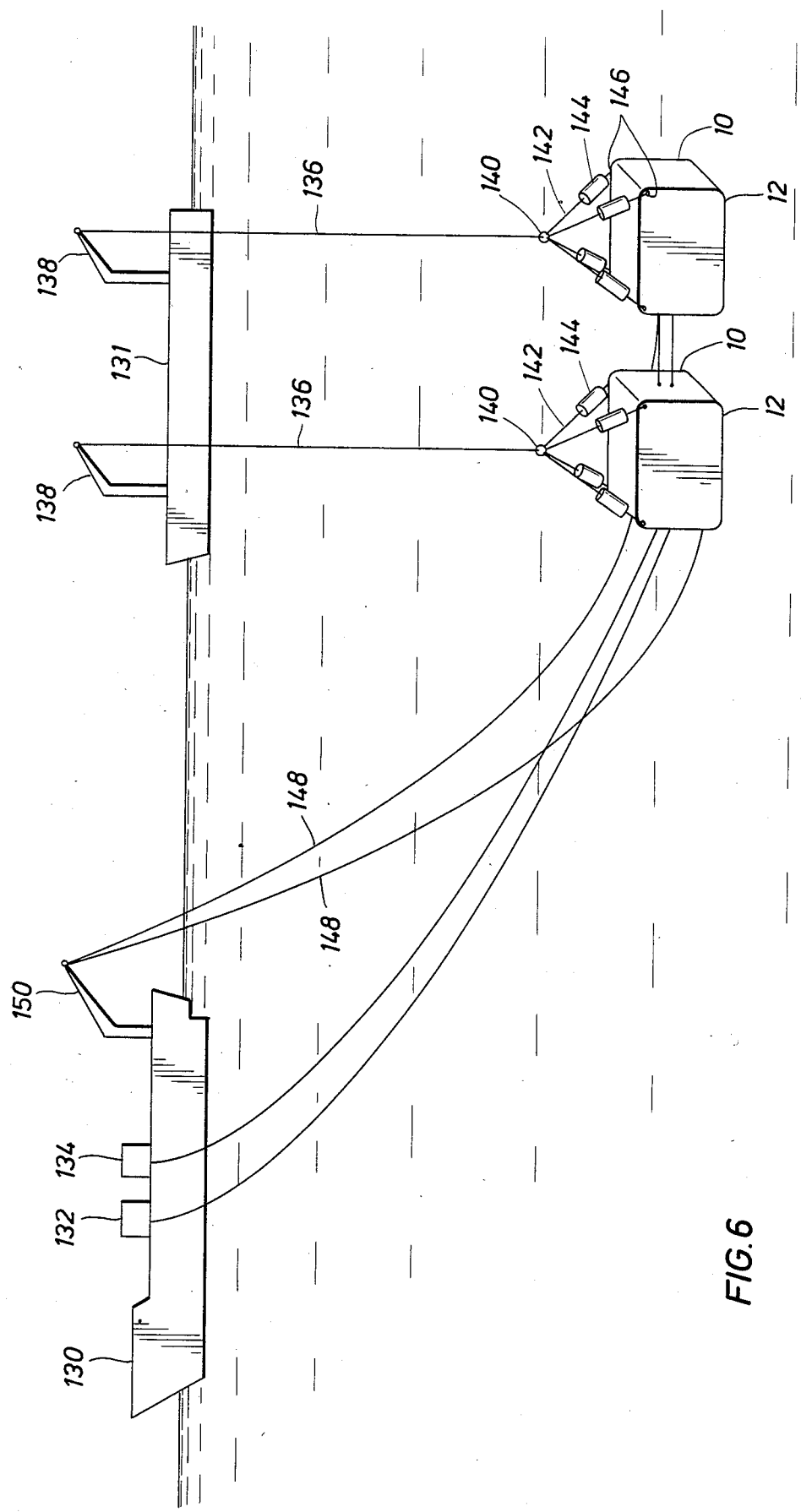
FIG. 6 depicts a deployment of the seismic source.

FIG. 6 shows a schematic view of a preferred embodiment of the inventive device in operation. The seismic source is operated from a support vessel 130 carrying auxiliary equipment such as hydraulic pump 132 and electronic control equipment 134. The seismic source is suspended at a proper depth by a lift cable 136 from float 131 by means of an arm 138.

The float 131 typically is not powered and is merely towed at a substantial distance behind the support vessel 130. The lift cable 136 may be connected to the seismic source via connector ring 140, a number of linkages 142, and shock absorbing springs 144 to a number of eye posts 146. The eye posts 146 may be welded to the frame of the source or onto the outer surfaces of radiating plates 10 and 12 near the midpoints of the curved leading and trailing edges of the radiating plates. The seismic source may be towed using a line 148 from a tow arm 150. Clearly, the seismic source may be used in multiple configuration much as illustrated in FIG. 6 or used singly. The manner of suspension and isolation described above is merely illustrative and other equivalent means of suspension and isolation could be used within the spirit of the invention.

The foregoing disclosures and description of the invention are only illustrative and explanatory thereof. Various changes in the size, shape and materials of construction, as well as in the details of the illustrated construction and operation, may be made within the scope of the appended claims without departing from the spirit of the invention.

I claim as my invention:

1. A device suitable for use as a marine seismic source comprising:
   dual opposed acoustic radiators,
   an actuator supported on a fixed support for oscillating each of said dual radiators to produce an acoustic signal in water having a frequency which changes with time, said actuators being mechanically connected to each said radiator,
   at least one spring system comprising adjustable length cantilever spring means rotatably attached to each acoustic radiator and having a length adjustable by means of a cantilever support slidably attached to said fixed support, and
   whereby the length of said cantilever spring means varies as a function of said frequency.

2. The device of claim 1 wherein the cantilever support is attached to a hydraulic cylinder adapted to slide the cantilever support along the cantilever spring as a function of said frequency.

3. The device of claim 1 wherein the cantilever support is attached to a pneumatic cylinder adapted to slide the cantilever support along the cantilever spring as a function of said frequency.

4. The device of claim 2 wherein said hydraulic cylinder is controlled by control means adapted to be responsive to said frequency.

5. The device of claim 3 wherein said pneumatic cylinder is controlled by control means adapted to be responsive to said frequency.

6. A device suitable for use as a marine seismic source comprising:
   dual opposed acoustic radiators,
   an actuator supported on a fixed support for oscillating each of said dual radiators to produce an acoustic signal in water having a frequency which changes with time, said actuators being mechanically connected to each said radiator, at least one spring system comprising a cantilever spring rotatably attached at one end to each acoustic radiator and fixedly attached to a coil spring fixedly attached to said fixed support at the other end and having a movable cantilever support slidably disposed between said ends, and whereby the position of said movable cantilever support varies as a function of said frequency.

7. The device of claim 6 wherein the cantilever support is attached to a hydraulic cylinder adapted to slide the cantilever support along the cantilever spring as a function of said frequency.

8. The device of claim 6 wherein the cantilever support is attached to a pneumatic cylinder adapted to slide the cantilever support along the cantilever spring as a function of said frequency.

9. The device of claim 7 wherein the hydraulic cylinder is controlled by control means adapted to be responsive to said frequency.

10. The device of claim 8 wherein the pneumatic cylinder is controlled by control means adapted to be responsive to said frequency.

11. A device suitable for use as a marine seismic source comprising:
dual opposed acoustic radiators,
an actuator supported on a fixed support for oscillating each of said dual radiators to produce an acoustic signal in water having a frequency which changes with time, said actuator being mechanically connected to each said radiator,
at least one adjustable cantilever spring means having a cantilever spring with a variable cross-section, cantilevered from said fixed support at one end, longitudinally rotatable at the other end but attached to said radiator, and longitudinally rotatable about its axis so as to result in a cantilever of varying thickness upon said rotation,
whereby the rotation of the cantilever spring means varies as a function of said frequency.

12. The device of claim 11 wherein the cantilever spring means is rotated by hydraulic cylinder means.

13. The device of claim 11 wherein the cantilever spring means is rotated by pneumatic cylinder means.

14. The device of claim 12 wherein said hydraulic cylinder means is controlled by control means adapted to be responsive to said frequency.

15. The device of claim 13 wherein said pneumatic cylinder means is controlled by control means adapted to be responsive to said frequency.

* * * * *